US010259213B2

(12) United States Patent
Cruz Lemus

(10) Patent No.: US 10,259,213 B2
(45) Date of Patent: Apr. 16, 2019

(54) APPARATUS AND METHOD FOR PRINTING ROLL CLEANING

(71) Applicant: Paper Converting Machine Company, Green Bay, WI (US)

(72) Inventor: Erico Cruz Lemus, Evanston, IL (US)

(73) Assignee: PAPER CONVERTING MACHINE COMPANY, Green Bay, WI (US)

( * ) Notice: Subject to any disclaimer, the term of this patent is extended or adjusted under 35 U.S.C. 154(b) by 0 days.

(21) Appl. No.: 15/375,599

(22) Filed: Dec. 12, 2016

(65) Prior Publication Data

US 2018/0162119 A1    Jun. 14, 2018

(51) Int. Cl.
*B41F 35/02*    (2006.01)

(52) U.S. Cl.
CPC .................... *B41F 35/02* (2013.01)

(58) Field of Classification Search
CPC ....................................... B41F 35/02
USPC ........................................ 101/425
See application file for complete search history.

(56) References Cited

U.S. PATENT DOCUMENTS

| | | | | |
|---|---|---|---|---|
| 4,350,988 A * | 9/1982 | Masegi | ................. | G11B 7/085 250/236 |
| 5,592,879 A * | 1/1997 | Waizmann | ............ | B08B 7/0042 101/416.1 |
| 6,354,213 B1 * | 3/2002 | Jenkins | ................... | B41F 35/04 101/483 |
| 6,828,524 B2 * | 12/2004 | Hong | .................... | B41J 2/16517 219/121.6 |
| 6,881,687 B1 * | 4/2005 | Castrucci | .............. | B08B 7/0021 134/1 |
| 7,633,033 B2 * | 12/2009 | Thomas | ................. | B23K 26/03 219/121.62 |
| 2002/0088094 A1 * | 7/2002 | Barclay | .............. | B65D 33/2508 24/30.5 R |
| 2004/0035540 A1 * | 2/2004 | Menp | ................... | D21G 1/0073 162/199 |
| 2005/0222559 A1 * | 10/2005 | Shiono | .................... | A61B 18/24 606/16 |
| 2007/0006892 A1 * | 1/2007 | Olesen | ...................... | B08B 3/12 134/1 |
| 2008/0252887 A1 * | 10/2008 | Honguh | ............. | G01N 15/1434 356/338 |
| 2009/0245896 A1 * | 10/2009 | Ishikake | ............ | G03G 15/2007 399/328 |
| 2011/0286067 A1 * | 11/2011 | Iwamatsu | ............ | G02B 26/127 359/204.5 |
| 2015/0128989 A1 * | 5/2015 | Sakuma | .............. | B22D 11/0611 134/1 |

* cited by examiner

*Primary Examiner* — Anthony H Nguyen
(74) *Attorney, Agent, or Firm* — Thompson Coburn LLP

(57) ABSTRACT

The invention relates to a device and method for cleaning the surface of a printing roll, such as an anilox roll. The device includes a laser-equipped assembly adapted to project a laser beam on the surface of the printing roll. The laser-equipped assembly uses a reflector and a lens to guide the laser beam along a predetermined path on the surface of the printing roll. In some embodiments, an autofocus system may be included to move the lens so that the desired focal point for the laser beam on the printing roll surface is achieved.

15 Claims, 4 Drawing Sheets

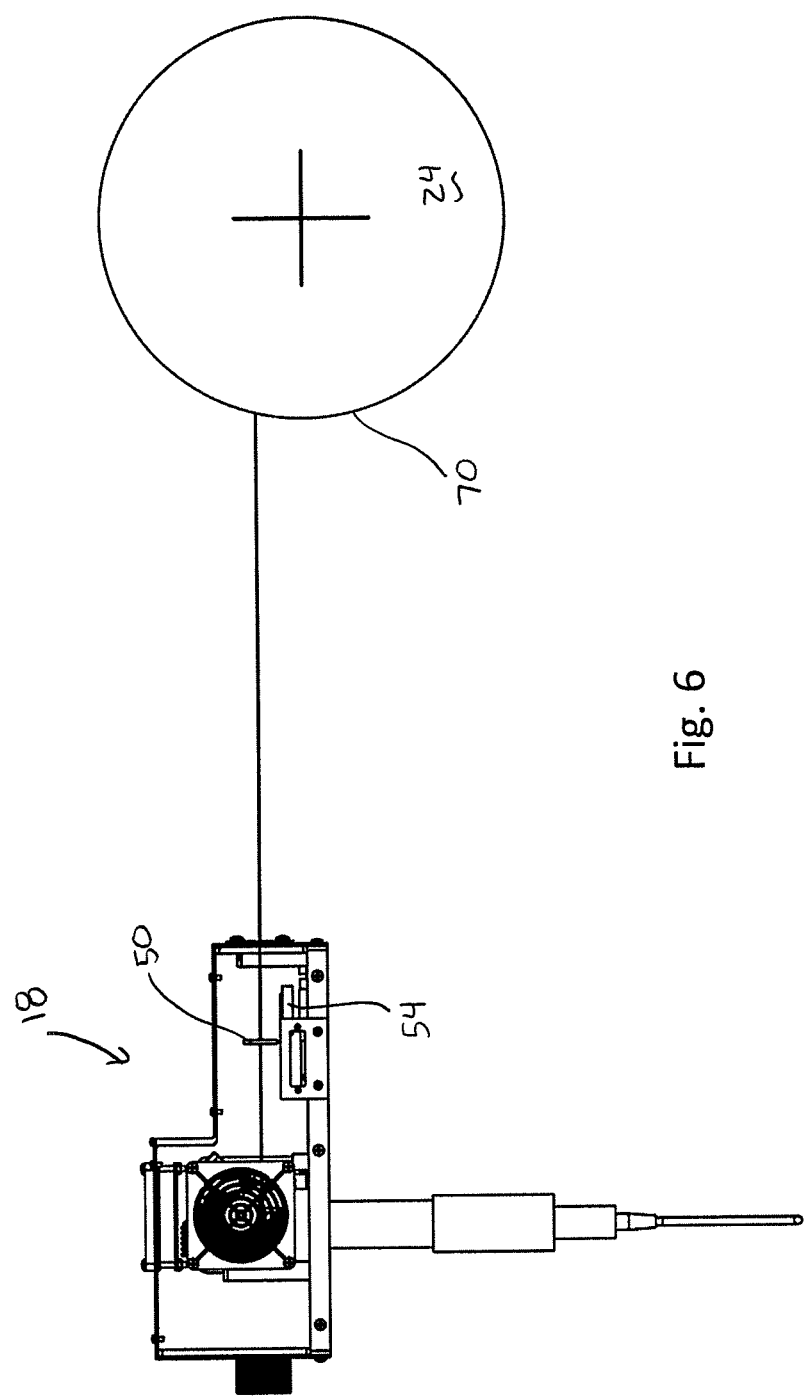

APPARATUS AND METHOD FOR PRINTING ROLL CLEANING

FIELD OF THE INVENTION

The subject invention generally relates to an apparatus and method for cleaning printing press rolls, and more specifically to an apparatus and method for cleaning anilox rolls, engraved rolls and printing rolls with similar surfaces.

BACKGROUND OF THE INVENTION

The present invention relates generally to systems and devices used in flexographic, gravure, offset and corrugated board printing as well as in laminating/coating industry. Flexography is a printing process that is used predominantly in the printing of packaging materials. Flexography may be used to print corrugated containers, folding cartons, paper sacks, plastic bags, milk and beverage cartons, disposable cups and containers, labels, adhesive tapes, envelopes, etc. Typically, a substrate is fed into the press from a roll, and is printed upon as the substrate is pulled through a series of print units, each of which prints a single color. The colors of the different print stations are overlaid to create the desired image. Each print unit includes several rollers, such as an ink roller, meter roller, plate cylinder, and impression cylinder. An anilox roller is a type of meter roller that may be an engraved metal or ceramic roller, and that transfers ink from the fountain roller to the printing plate. The characteristics of an anilox roll determine the amount of ink that will be transferred to the plate. Such rolls are typically constructed of a hard metal core that is coated by ceramic, chrome, and other metalls, and whose surface contains millions of very fine dimples, known as cells. The substrate then moves between the plate cylinder with the printing plate and the impression cylinder. The impression cylinder applies pressure to the plate cylinder so the image is transferred from the plate to the substrate.

Over time, the cells of anilox rollers may become fouled with dried ink. The dried ink limits the amount of ink that may be carried by the anilox roller, and reduces the effectiveness of the roll. Therefore, anilox rollers must be cleaned periodically.

Prior art methods of cleaning anilox rollers include using mechanical cleaning, chemical solvents, soda blasting, and ultrasound processes. Each of these methods has certain drawbacks.

Mechanical methods involving brushes or other mechanical abrasives are slow and may damages the surface of the roll. The use of chemical solvents to clean anilox rolls also face a number of disadvantages. In some methods of chemical cleaning, the use of chemical products to remove ink also involves a manual action by means of brushes. While this operation can be performed while the roller is rotating, the mechanical action and chemical cleaner application must be carefully synchronized. Once manual cleaning is over, the roller must be washed immediately to remove the caustic agent and the product wastes. Another method involves off-line cleaning by way of caustic chemicals that dissolve the ink residue in the cells. Such methods typically involve partial immersion of the rollers in a bath of cleaning solution or the chemicals are sprayed on the roller. In both cases, the chemical agent gives rise to a chemical reaction to dissolve the ink deposits. At the end of the cycle, the roller is washed with water to stop the chemical reaction and to remove the cleaning product and the ink wastes. Chemical solvents are, however undesirable due to their environmental impact and potential harm to people. In addition, the costs of removing waste products can be substantial.

Another common method for cleaning anilox rolls involves soda blasting. While cleaning by way of soda is relatively easy to use and causes low environmental impact, there are still shortcomings. For example, soda blasting involves high pressure spraying of soda in water. Spraying the roll evenly is difficult. Also, the soda may cause damage to the material defining the cells, especially with a ceramic surface. Similar to chemical cleaning, the disposal of waste products can also be substantial.

Yet another method involves spraying crystals of solid carbon dioxide (dry ice) onto the cylinders. As with soda blasting, the potential for harm to the anilox roller surface with this method is substantial.

Another system for cleaning anilox rolls involves ultrasound systems. While such systems are unlikely to cause damage to the rolls and do not suffer from environmental issues, the speed of such systems is somewhat limited, thus leading to greater downtime.

A more recent technology that has been used involves using a laser to clean the anilox roll. A laser beam is moved along a path over the surface of the anilox roll and the laser beam burns off the dried ink. An example of such technology is described in the inventor's Spanish patent 2,390,039, the teachings of which are incorporated herein by reference.

This earlier technology, while proving to be very effective to clean anilox rollers, still faces some shortcomings. For example, in order to cause the laser beam to move along desired patch on the surface of the anilox roll, the laser beam is directed by a reciprocating or oscillating mirror. Because the laser was oscillated by a scanner or mirror in a back and forth pattern across a field, the scanning speed was limited. A further issue with the earlier technology related to the fact that anilox rolls come in different diameters. Because of this, the optimal focal point for the laser may not be easily obtained for a particular roll without adjustment of the roll relative to the laser generator.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, an apparatus for cleaning a printing roll is provided. For purposes of illustration, an anilox roll is discussed. The apparatus may comprise a mount adapted to rotatably secure the anilox roll. This mount may be configured to secure the roll so that the roll is rotatable. In a preferred embodiment, the mount comprises a plurality of parallel rollers to support the anilox roll by resting the anilox roll on the rollers. The parallel rollers are operatively connected to a drive system as is known in the art for rotating the parallel rollers and the anilox roll thereon during the cleaning process. In some embodiments of the present invention, the anilox roll cleaner may be operable with print unit having the anilox roll such that a separate mount is unnecessary. In this embodiment, the cleaning apparatus may be positioned adjacent to the anilox roll.

The anilox roll cleaning apparatus further includes a laser-equipped assembly. This assembly comprises a laser source configured to generate and direct a laser beam. In some embodiments, the laser-equipped assembly comprises a reciprocating reflector that is positioned to receive the laser beam from the laser source and to redirect the laser beam. One issue that may occur with reciprocating reflectors is that as the reflector is moved back and forth, as it reaches the end of one movement, it must decelerate, change direction, and then accelerate again. Because of this, the laser beam energy is focused for longer periods of time at the ends of its path than in the middle, which causes hotspots or burnouts that may damage the surface of the anilox roll or create a non homogeneous cleaning. In preferred embodiments of the present invention, it is preferred to include lateral shields to block a certain portion of the path of the laser energy to prevent such hotspots.

In other embodiments, the laser-equipped assembly includes a rotatable polygonal reflector. In a preferred embodiment, the laser beam is redirected by polygonal reflector along a repeated unidirectional path for cleaning the surface of the anilox roll. This is achieved by way of the rotation of the polygonal reflector about an axis such that the facets of the reflector intercept the laser beam. As the reflector rotates, the changing angle of the surface of the facets relative to the path of the laser beam from the laser source causes the laser beam to be redirected in repeated succession a desired path. The relative shape and angles of the facets may vary so as to cause the laser beam to traverse paths of different lengths and shapes, e.g., straight or curved.

Unlike the reciprocating or oscillating scanner the polygonal reflector moves the laser along a desired path in a single direction in a repeating manner. As such, there is no need for any deceleration or directional change. Accordingly, the greater concentration of laser energy at the ends of the path of the laser beam is eliminated such that the entire range of the laser beam can be used. Also, the rate at which the scanner can be operated is substantially higher than with an oscillating or reciprocating scanner since there is no change in the direction of rotation necessary.

With either of the reciprocating scanner or a rotating polygonal scanner, after the laser beam is reflected off the reflector, it is directed through a lens. In a preferred embodiment, the second lens is a f-theta lens. This lens focuses the laser beam to a desired intensity and beam diameter at a desired focal position a certain distance from the lens.

The laser-equipped assembly preferably further includes an autofocus system. The optimal focal position of the laser beam primarily depends on the size of the particular anilox roller to be cleaned. Anilox rolls come in a wide variety of diameters. The autofocus system enables the apparatus to adjust the distance of the lens relative to the surface of the anilox roll such that the focal length for a particular lens coincides with the surface of the anilox roll. The autofocus system comprises a carrier that is operatively connected to the lens, and a distance determiner. The distance determiner may take the form of various technologies that are used to determine whether objects are the desired distance from one another. This saves substantial setup time and reduces downtime for printing operations.

In some embodiments, the distance determiner may comprise an active autofocus system. Active autofocus systems typically include an energy emitter that is configured to transmit an emitted energy at an object. Active autofocus systems further include an energy receiver that is adapted to receive the reflected energy. In the present invention, an energy emitted is configured to transmit an emitted energy at the surface of the anilox roll. The energy reflected offer the anilox roll surface is received by the energy receiver, which generates a signal that represents a characteristic of the reflected energy. A programmed processor then determines whether the distance of the laser assembly to the surface of the anilox roll is as desired based on the signal. To the extent that adjustment is necessary, the processor is further programmed to actuate the carrier to adjust the position of the lens relative to the surface of the anilox roll such that the focal position of the laser is positioned as desired on the anilox roll surface. The emitted energy may take any number of forms, such as a low-powered laser beam, a collimated light beam, infrared light, or ultrasonic waves. As the emitted energy strikes the surface of the anilox roll, a portion of the emitted energy is reflected back towards the laser-equipped assembly and its energy receiver. The energy receiver is adapted to receive the reflected energy and generate a signal representing a characteristic of the reflected energy. For example, the signal may represent the time the reflected energy is received. The signal may, alternatively or in addition, represent an intensity of the reflected energy receiver or a time that the reflected energy was received.

The processor may comprise any microprocessor or other programmable device. The processor is programmed to utilize the signal from the energy receiver to calculate the distance of the surface of the anilox roll to the laser assembly. This calculated distance can be used, along with information regarding the position of the lens, to determine whether the laser beam assembly, and especially the lens, is in the proper position such that the focal length of the laser beam focused by the lens coincides with the surface of the anilox roll.

Alternatively or additionally, the distance determiner may comprise a passive autofocus system. For example, the passive autofocus system may comprise a phase detector or a contrast detector. Certain passive autofocus systems, such as contrast detectors do not require an energy emitter. Instead, such an autofocus system merely determines the maximum contrast point for an image, which would typically be at the desired focal point.

If the position of the laser beam assembly is such that the focal position is not optimal, the processor may actuate the carrier to adjust the position of the lens relative to the surface of the anilox roll to a predetermined distance. For example, the entire laser beam assembly may be moved closer or farther from the surface of the anilox roll. More preferably, the lens held by a carrier may be moved within the laser beam assembly to adjust the location of the focal position. This feature is advantageous in that anilox rolls may be of different sizes. As such, the distance of the surface of the anilox roll relative to the laser assembly may require adjustments in order to have the desired focal position of the laser properly coincide with the surface of the roll. It should be recognized that the distance determination may be a quantitative determination or may be a qualitative determination as to whether the relative distance of the lens to the anilox roll is the correct distance or not. For example, with a passive distance determiner, the apparatus may determine that the relative distance of the lens to the anilox roll is the correct distance is incorrect and cause the carrier to adjust the position until the correct distance is achieved.

The present invention further includes a method for cleaning anilox rolls. The method includes positioning the anilox roll to be cleaned adjacent to a laser-equipped assembly. This may include placing an anilox roll in an off-line apparatus for cleaning the anilox roll. Alternatively, the anilox roll can remain in the print unit and the laser-equipped assembly is positioned adjacent the anilox roll in the print unit. The method further includes in some embodiments actuating the autofocus system to determine the distance of the laser-equipped assembly from the surface of the anilox roll. Actuating the autofocus system may include causing an emitter to transmit an emitted energy at the surface of the anilox roll. Actuating the autofocus system may further cause an energy receiver to be ready to receive reflected energy, and after receiving the reflected energy, to generate a signal representing a characteristic of the reflected energy, as discussed. Actuation of the autofocus system further causes a processor, which is programmed with the appropriate algorithms, to determine whether the distance of the surface of the anilox roll to the laser assembly is correct. To the extent that the focal position of the laser beam is not in a desired position, the processor causes a carrier to adjust the focal position of the laser beam by either adjusting the lens or the position of the laser-equipped assembly. Once the lens is properly positioned, the processor actuates the laser cleaning assembly so as to generate the laser beam for cleaning.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein:

FIG. 6 is an enlarged side schematic view of a laser beam engaging the surface of an anilox roll with the laser assembly shown with the external housing removed.

DETAILED DESCRIPTION OF THE INVENTION

Figure 1:
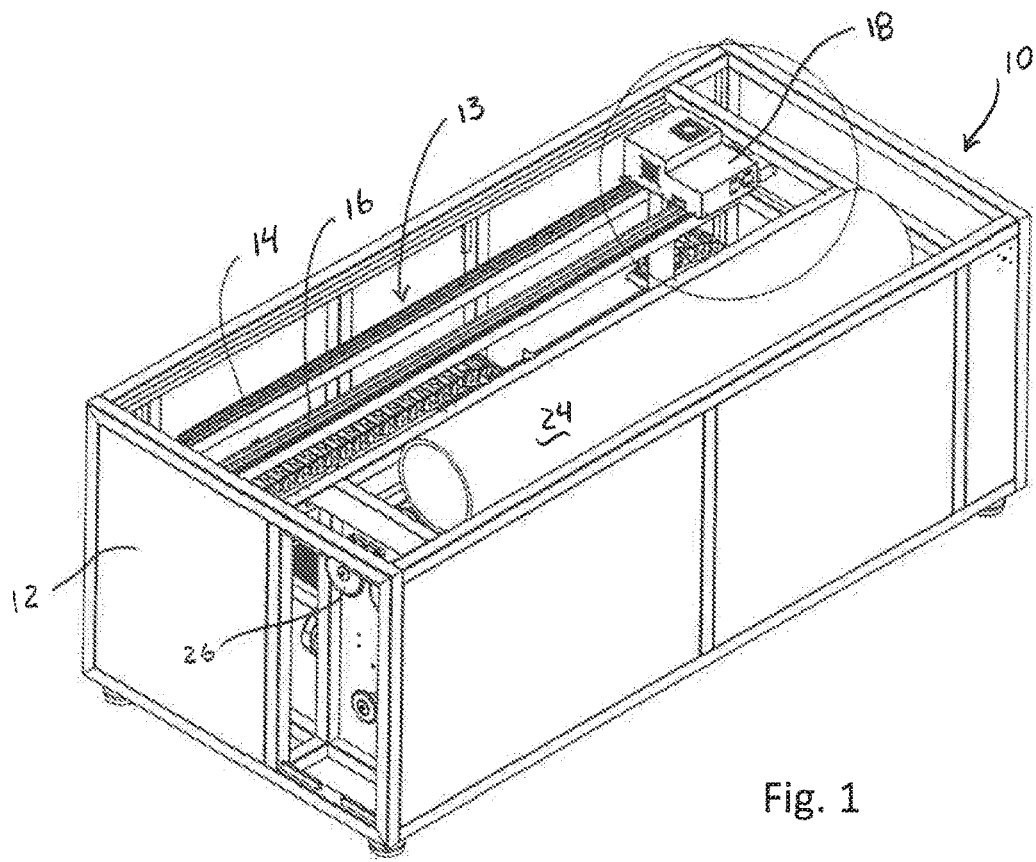
FIG. 1 is a perspective view of an exemplary embodiment of an anilox roll cleaning apparatus in accordance with a preferred embodiment of the present invention.

Exemplary embodiments of the present invention are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention. The present invention relates to a system for removing materials such as paint and other coatings from various surfaces, wherein the system includes a laser scanner having multiple optics. With reference now to the Figures, one or more specific embodiments of this invention shall be described in greater detail.

Figure 1A:
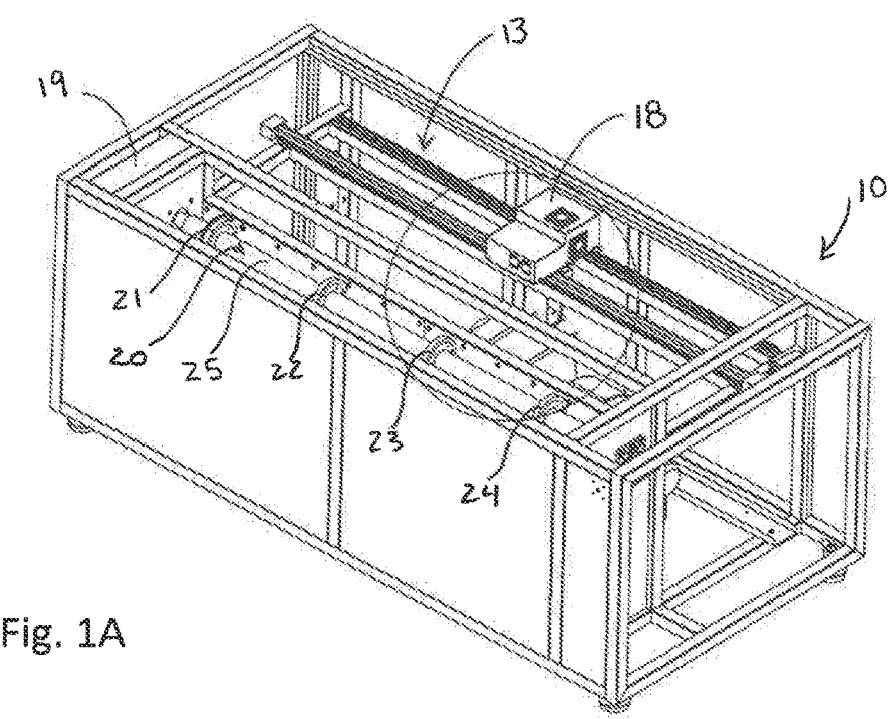
FIG. 1A is a perspective view of the anilox roll cleaning apparatus of FIG. 1 without the anilox roll.

Referring to FIG. 1, an anilox roll cleaning machine according a preferred embodiment of the invention is shown. As discussed, the anilox roll is discussed by way of example with the understanding that the present invention is suitable for use with other printing rolls. The machine 10 includes a frame 12. Supported by the frame 12 is a conveyor 13 comprising a pair of tracks 14 and 16. Mounted with the conveyor is a laser-equipped assembly 18, which will be discussed in further detail below. Positioned parallel to the conveyor is a mount 19, which in this embodiment comprise a plurality of rollers 20 and one that is not visible in this drawing (FIG. 1A). In this embodiment, each of the pair of rollers is similarly configured. Roller 20 includes a plurality of spaced discs 21, 22, 23, and 24 rotatably secured to an axle 25. The rollers 20 and the roller not visible are aligned parallel to one another and spaced such that a variety of different sized anilox rolls, such as anilox roll 24, may be supported by the rollers. During the cleaning operation, the laser-equipped assembly 18 is moved by the conveyor 13 along and parallel to the anilox roll 24. While in this preferred embodiment, the conveyor 13 comprises a pair of tracks 14 and 16, any conveyor suitable to support and move the lase-equipped assembly parallel to the anilox roll as is known in the art may be used. The mount 19 may include other configurations, such as additional rollers, or axial mounts for rotating the anilox roll 24. Operatively connected to the mount is a drive system 26. The drive system 26 may be mechanically or electrically driven or driven by any means known in the art to cause the anilox roll 24 to be rotated. The drive may also include a fine tuning adjustment to increase or decrease the speed of the rollers.

Figure 2:
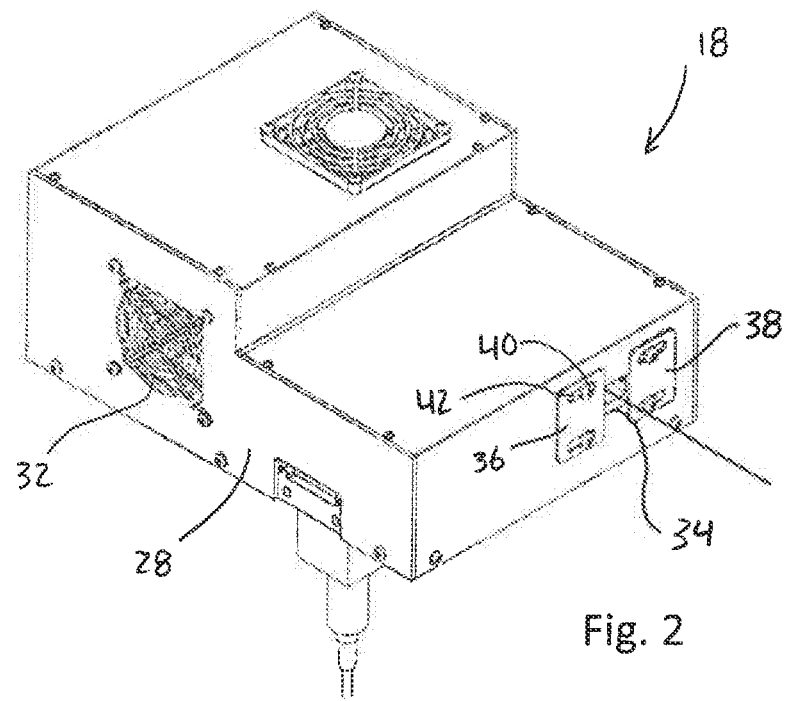
FIG. 2 is an enlarged perspective view of the laser assembly of FIG. 1 shown in an assembled state.

Referring to FIG. 2, the laser-equipped assembly 18 comprises a housing 28. The housing 28 may include a plurality of exhaust ports 30, 32 to vent heat from the assembly 18. In this preferred embodiment, the housing 28 defines an aperture 34 parallel to and facing the anilox roll 24. The aperture 34 includes on lateral sides thereof a pair of lateral shields 36 and 38. The shields 36 and 38 are secured to the housing by way of bolts 40 passed through slots 42. The shields 36 occlude a portion of aperture 34. The amount of occlusion may be adjusted by varying the position of the bolts 40 within the slots 42. As will be discussed in further detail, the laser-equipped assembly 18 generates a laser beam 44, which exits through aperture 34 to focus laser energy on the surface of the anilox roll 24. The laser beam is of a power sufficient to burn away any ink or other residue in the cells of the anilox roll 24 without damaging the surface of the anilox roll itself.

Figure 3:
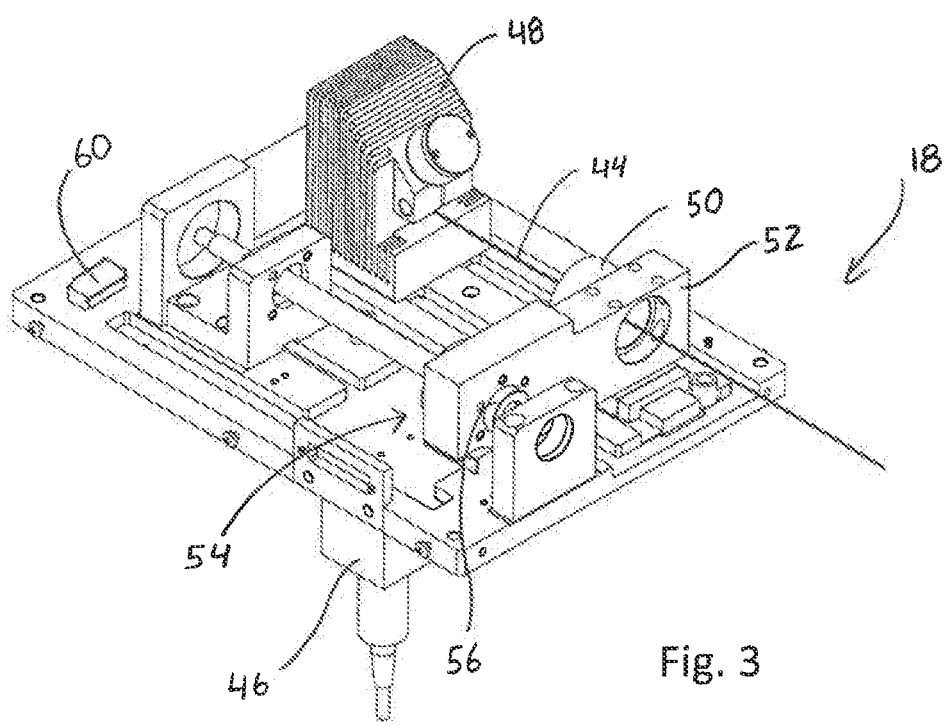
FIG. 3 is an enlarged perspective view of the laser assembly of FIG. 2 with an external housing removed to show the interior

Shown in FIG. 3 is a view of the interior of the laser-equipped assembly 18 with the housing 28 removed. A laser source 46 is provided to generate laser beam 44. In this particular embodiment, the laser source 46 is mounted vertically, but may alternatively be mounted horizontally. A reflector (not shown) is included in reflector assembly 48. Lens 50 is provided to receive the laser beam from the reflector after exiting the reflector assembly 48 to focus laser beam 44. Lens 50 is mounted with carrier 52 of autofocus system 54. In this embodiment, the lateral position of the lens 50 relative to the reflector assembly 48 is adjustable such that the focal point of the laser energy is adjustable. The autofocus system 54 further includes a distance determiner 56. The distance determiner 56 communicates with a programmed processor 60, which determines whether the distance of the laser assembly to the surface of the anilox roll is as desired. The processor then causes the carrier 52 to be adjusted to move the lens 50 so it is in a desired position.

It should be understood that there are various ways to measure distance, and the distance determiner 56 may utilize different methods. For example, the distance determiner 56 may include an energy emitter that emits ultrasonic sound waves or infrared light. In the first case, sound waves are emitted, and by measuring the delay in their reflection, distance to the subject is calculated. With an infrared light emitter, two emitters may be used to triangulate the distance to the anilox roll surface. Another type of distance determiner may use a laser rangefinder. Such a rangefinder uses a laser beam to determine the distance to the anilox roll surface. Similar to the ultrasonic emitter, a laser rangefinder may operate on the time of flight principle by sending a laser pulse towards the anilox roll surface measuring the time for the return reflection. Alternatively, a laser rangefinder may utilize triangulation techniques.

Alternative to the aforementioned active autofocus methods, a passive autofocus system can be used. One such method utilizes phase detection. Phase detection is achieved by dividing incoming light into pairs of images and comparing them. Another form of passive autofocus involves contrast detection, which is achieved by measuring contrast within a sensor field through a lens. The intensity difference between adjacent pixels of the sensor naturally increases with correct image focus. The optical system can thereby be adjusted until the maximum contrast is detected.

Figure 4:
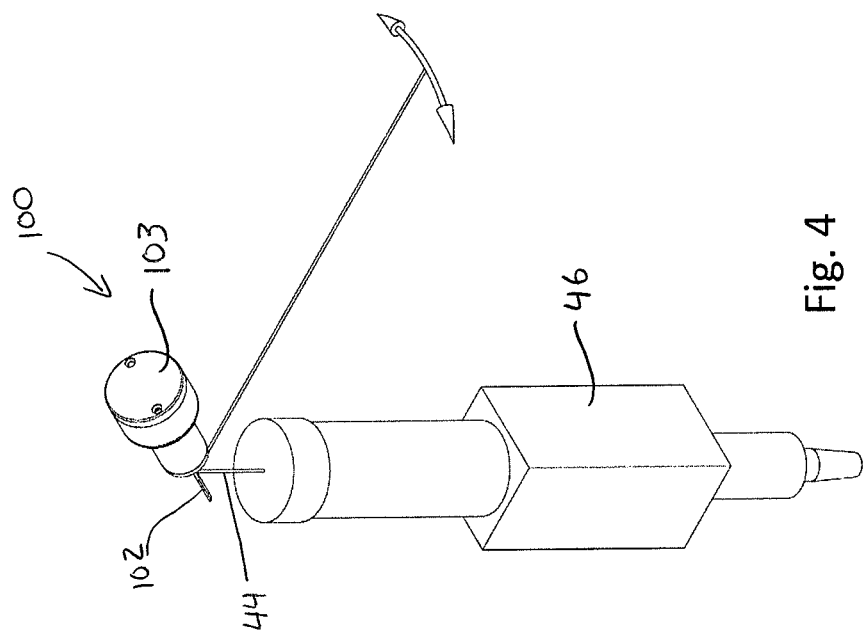
FIG. 4 is an enlarged perspective schematic view of a laser source and a reciprocating reflector according a preferred embodiment of the invention.

Referring to FIG. 4, one preferred embodiment of a reflector is described. The reflector 100 receives a laser beam 44 from laser source 46, which in this example is depicted as a vertically disposed laser source. The laser beam 44 strikes reflector face 102, which is mounted on reflector body 103. The laser beam 44 is then redirected as shown. The reflector body is operatively connected to an oscillator (not shown), which causes the reflector body 104 to pivot back and forth a desired magnitude and frequency. As the reflector body 104 is pivoted, the angle of the reflector face 102 relative to the laser source changes. Since the generation of the laser beam 44 is continuous, the laser beam, when it contacts the surface of the anilox roll, moves along a linear path. With the reciprocating or oscillating reflector, the laser traces a back and forth pattern. Because the reflector body, as it pivots, must decelerate, change direction, and accelerate at the ends of its cycle, the laser is directed to the edges of the linear path for a greater amount of time than in the middle of the path. This may cause burn outs. Therefore, as shown in FIG. 2, the linear shields 36 occlude the aperture to block such portions of the laser's linear path so that the laser does not reach the anilox roll surface.

Figure 5:
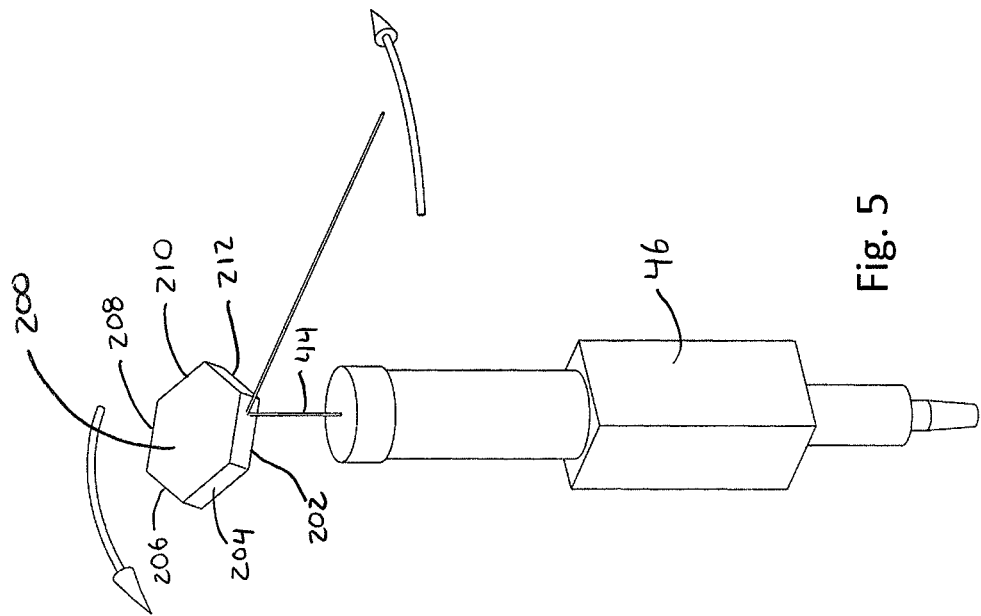
FIG. 5 is an enlarged perspective schematic view of a laser source and a rotating polygonal reflector according to an alternative preferred embodiment of the invention.

Referring to FIG. 5, an alternative preferred embodiment of a reflector is described. In this embodiment, a polygonal reflector 200 is included. Similar to the reciprocating reflector, the polygonal reflector 200 receives a laser beam 44 from laser source 46. The laser beam 44 strikes facets 202, 204, 206, 208, 210, and 212 of the polygonal reflector as it is rotated. In this embodiment a hexagonal reflector is shown, but other polygons may be used. The polygons, however, should be regular polygons. As the polygonal reflector 200 is rotated and the laser is reflected off of a facet, such as facet 202, the angle of the facet relative to the laser source 46 changes, such that the reflected laser traces a linear path on the anilox roll surface. Unlike with the reciprocating reflector, the polygonal reflector is rotated in a single direction, not back and forth. Accordingly, the laser traces a unidirectional path on the surface of the anilox roll. This configuration will not result in burn outs since the reflector moves at a constant rate. In such an embodiment, linear shields are unnecessary. Also, because there is no need to change direction, the speed at which the laser path can be traced can be higher.

Referring to FIG. 6, further explanation of the autofocus system. In this example, the lens 50 is such that the optimal distance of the lens from the anilox roll surface 70 is 150 mm. The autofocus system 54 adjusts the distance of the lens relative to the anilox roll surface 70 such that the lens is 150 mm away.

While the present invention has been illustrated by the description of exemplary embodiments thereof, and while the embodiments have been described in certain detail, it is not the intention of the Applicant to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the applicant's general inventive concept.

I claim:

1. An apparatus for cleaning a printing roll, the apparatus comprising:
   a support adapted to position a housing, the housing including a laser-equipped assembly comprising an autofocus system in operative proximity to the printing roll, wherein the housing includes an aperture and at least one shield adjacent the aperture, and the laser-equipped assembly is mounted with the support and comprises:
      a laser source configured to generate and direct a laser beam at a surface of the printing roll for cleaning of the printing roll;
      a reciprocating reflector positioned to receive the laser beam from the laser source and to repeatably redirect the laser beam along a predetermined path, the reciprocating reflector reciprocating independent of the position of the housing; and
      a lens adapted to receive the laser beam from the reciprocating reflector and to direct the laser beam through the aperture to a focal position; and
   the autofocus system comprising:
      a carrier operatively connected to the lens;
      an emitter configured to transmit an emitted energy at the surface of the printing roll such that a reflected energy from the surface of the printing roll is subsequently reflected for measuring of a distance of the surface of the printing roll to the laser-equipped assembly;
      an energy receiver adapted to receive the reflected energy from the emitter and generate a signal representing a time characteristic of the reflected energy; and
      a processor programmed to determine the distance of the surface of the printing roll to the laser-equipped assembly based on the signal and to actuate the carrier to adjust a position of the lens relative to the surface of the printing roll such that the focal position of the laser beam of the laser is positioned at a desired location on the surface of the printing roll.

2. The apparatus of claim 1, wherein the reciprocating reflector includes a reflector body and a reflector face mounted on the reflector body.

3. The apparatus of claim 2, wherein the at least one lateral shield is adjustable and configured to be adjusted to a position on the housing that occludes a portion of the aperture, thereby blocking a portion of the linear path of the laser beam from the lens.

4. The apparatus of claim 3, wherein the at least one lateral shield comprises a pair of lateral shields.

5. The apparatus of claim 1, wherein the emitter is configured to emit one of a laser beam, an infrared light, a collimated light beam and an ultrasonic signal.

6. The apparatus of claim 5, wherein the time characteristic of the reflected energy comprises at least one of a receipt time of the reflected energy and an intensity of the reflected energy.

7. The apparatus of claim 4, wherein the pair of lateral shields includes a first shield and a second shield, the first shield is secured to the housing at a first side of the aperture, and the second shield is secured to the housing at a second side of the aperture opposite the first side.

8. The apparatus of claim 7, wherein the first shield includes a first slot, the second shield includes a second slot, the first slot is configured to receive a first fastener for securing the first shield to the housing, and the second slot is configured to receive a second fastener for securing the second shield to the housing.

9. The apparatus of claim 8, wherein a position of the first shield with respect to the aperture is configured to be adjusted by adjusting a position of the first fastener within the first slot, and a position of the second shield with respect to the aperture is configured to be adjusted by adjusting a position of the second fastener within the second slot.

10. The apparatus of claim 1, wherein the autofocus system comprises an active autofocus system.

11. An apparatus for cleaning a printing roll, the apparatus comprising:
a support adapted to position a housing, the housing including a laser-equipped assembly comprising an autofocus system in operative proximity to the printing roll, wherein the laser-equipped assembly is mounted with the support and comprises:
a laser source configured to generate and direct a laser beam at a surface of the printing roll for cleaning of the printing roll;
a rotatable polygonal reflector positioned to receive the laser beam from the laser source and to redirect the laser beam across a unidirectional path, the rotatable polygonal reflector rotating independent of the position of the housing; and
a lens adapted to receive the laser beam from the rotatable polygonal reflector and to direct the laser beam through the aperture to a focal position; and
the autofocus system comprising:
a carrier operatively connected to the lens;
an emitter configured to transmit an emitted energy at the surface of the printing roll such that a reflected energy from the surface of the printing roll is subsequently reflected for measuring of a distance of the surface of the printing roll to the laser-equipped assembly;
an energy receiver adapted to receive the reflected energy from the emitter and generate a signal representing a time characteristic of the reflected energy; and
a processor programmed to determine the distance of the surface of the printing roll to the laser-equipped assembly based on the signal and to actuate the carrier to adjust a position of the lens relative to the surface of the printing roll such that the focal position of the laser beam of the laser is positioned at a desired location on the surface of the printing roll.

12. The apparatus of claim 11, wherein the emitter is configured to emit one of a laser beam, an infrared light, a collimated light beam and an ultrasonic signal.

13. The apparatus of claim 11, wherein the time characteristic of the reflected energy comprises at least one of a receipt time of the reflected energy and an intensity of the reflected energy.

14. The apparatus of claim 11, further comprising a housing including an aperture, wherein the lens is positioned within the housing and the laser beam is directed through the aperture.

15. The apparatus of claim 11, wherein the autofocus system comprises an active autofocus system.

* * * * *